Aug. 24, 1965  D. LA VERN EMMONS  3,202,149
CARDIOTACHOMETER
Filed Feb. 27, 1963
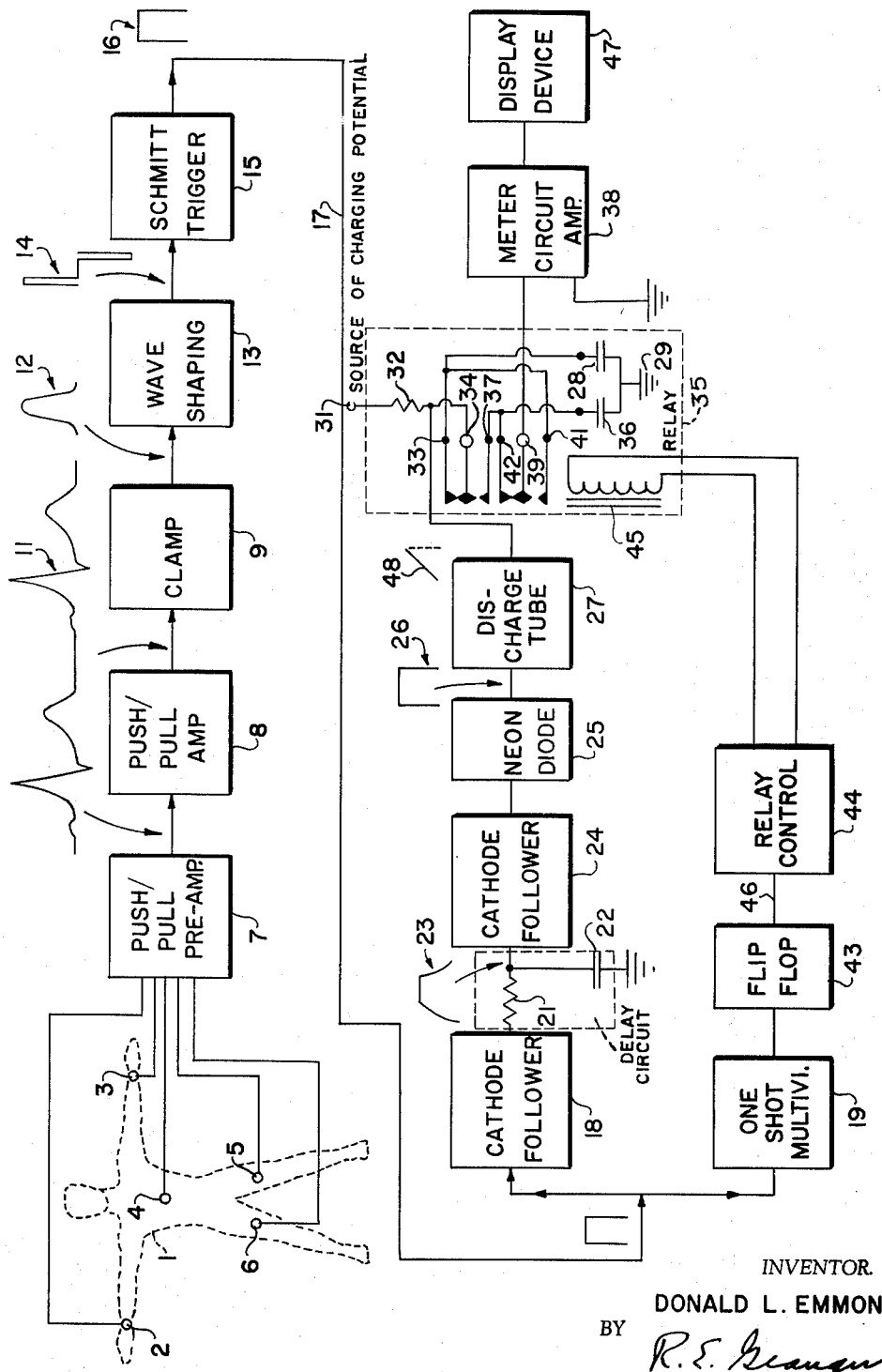
INVENTOR.
DONALD L. EMMONS
BY
R. E. Geauque
ATTORNEY 3,202,149
CARDIOTACHOMETER
Donald La Vern Emmons, La Puente, Calif., assignor to
The Birtcher Corporation, Los Angeles, Calif., a corporation of California
Filed Feb. 27, 1963, Ser. No. 261,374
12 Claims. (Cl. 128—2.05)

This invention relates broadly to pulse rate measuring apparatus, and more particularly to cardiotachometer apparatus for detecting, measuring and displaying heart rate.

It is frequently desirable and often important to know the heart beat rhythm of a patient while undergoing anesthesia, or undergoing operative or similar procedures where it is important for the person attending to notice rapidly any change in rate or rhythm of the patient's heart action in order to enable the anesthetist or surgeon to be rapidly aware of, and thus to treat, any sudden change in the patient's heart rate.

Also, in many conditions it is important to know the pulse repetition rate of each single beat and thus determine any arrhythmia and also minimize the effects of any false indications from the pickup device or errors from transient events such as muscular spasms which might actuate an instrument and be falsely recorded as a heart beat. Electrocardiographs give a measure of heart conditions but are inconvenient for measuring the heart beat rate.

Various means have been proposed heretofore to provide these desiderata. However, prior devices have suffered from a number of shortcomings. For example, if the apparatus is sufficiently sensitive to respond to feeble heart potentials, it has been undesirably sensitive to extraneous or spurious signals such as man-made interference from electrical apparatus in the vicinity of the patient and/or bioelectric signals unrelated to heart action such as muscle spams. The apparatus of the present invention overcomes these and other shortcomings of prior apparatus in that it is insensitive to spurious signals and artifacts and is responsive solely to potentials generated by the beating heart.

As provided by the present invention, novel and improved apparatus electrically samples the pulses repetition frequency of the heart during successive sampling intervals of a given length and provides a continuous indication of the average heart rate extant during each interval. Further objects and advantages of the invention will in part be obvious and will in part appear hereinafter.

It is, therefore, a principal object of the invention to provide automatic apparatus for the measurement and continuous display of pulse repetition frequency.

Another object of the invention is to provide novel and improved apparatus for continuously indicating the average number of true pulses occurring in each of a series of sequential sampling periods of given length.

Yet another object of the invention is to provide an automatic heart rate measuring apparatus for sampling and displaying heart rate at periodic intervals.

Still another object of the invention is to provide novel and improved apparatus which may be attached to a patient undergoing surgery or the like, to provide an instantaneous and constant visual indication of the heart rate and the rhythm of heart action of the patient at any desired point remote from the patient.

A general object of the invention is to provide novel and improved cardiotachometer apparatus which overcomes disadvantages of previous means and methods heretofore intended to accomplish generally similar purposes.

There is shown in the accompanying drawing a block diagram of a cardiotachometer constructed according to the present invention. Inasmuch as each of the functional units represented by a block in the diagram may be any one of the numerous devices for each respective function well known in the art, it is deemed unnecessary to show circuit details. In the drawing there is shown a patient 1 to which is applied a plurality of signal pickup electrodes (2–6) of any suitable and well-known construction responsive to electrocardiographic (EKG) signals.

Electrodes 2–3 and 5–6 are each applied to a corresponding peripheral body member at suitable digital or limb pickup points. Typically, electrodes 2 and 3 are connected to the wrists and electrodes 5 and 6 are connected to the legs of the patient's body. Electrode 4 preferably is located in the region over the heart. The electrodes (2–6) are connected by suitable leads to the inputs of push/pull pre-amplifier 7.

It should be undnerstood that the invention is not dependent upon a particular electrode or pickup system since any means capable of obtaining the electrocardiographic QRS complex from the heart may be used. Standard bipolar limb leads of the type shown in the drawing will provide potential differences between two extremities when each is connected to corresponding ones of the input terminals of pre-amplifier 7. A unipolar lead input is obtained when one electrode, usually referred to as an exploring electrode, is coupled with an "indifferent" terminal whose potential is close to the mean potential of the body during the entire cardiac cycle. As is well known to those versed in the art, an indifferent or neutral electrode of this kind may be obtained by connecting three or more extremities (e.g., electrodes 2–3 and 5–6) over appropriate resistors to a common central terminal which in turn is connected to one of the input terminals. Unipolar leads placed in the vicinity of cardiac muscle are believed to be preferentially influenced by electrical events subjacent to the electrode position. The preferred system, employing as an indifferent terminal ,multiple pickups from relatively remote parts of the body, is shown in the drawing. The electrical average of these not-very-large potentials is used as a zero, or reference point. The more active electrode (4) is used at locations close to the heart.

Pre-amplifier 7 comprises any suitable high-gain amplifier having an ungrounded or "floating" input adapted to be supplied wtih the QRS signal generated by the heart. Pre-amplifier 7 is followed by a push/pull power amplifier 8 having a single-ended output. The use of push/pull input stages is preferred because of their superior common-mode rejection characteristics. The output from amplifier 8 is supplied to clamp 9 which limits the maximum excursion of the amplified signal. The overall gain of amplifiers 7 and 8 is sufficient to drive the clamp input to the clamping limit regardless of the EKG input level from patient 1. Since the R pulse of the QRS complex has the maximum amplitude, clamp 9 effectively limits the maximum excursion of the R wave component. The PQRST wave complex is indicated at 11 and the clamped waveform is indicated at 12.

The clamped waveform 12 is supplied to a wave shaping circuit 13 which differentiates the clamped R wave to provide a spike pulse, the waveform of which is shown at 14. This spike pulse (14) provides a reliable triggering pulse input to Schmitt trigger 15. Schmitt trigger 15 comprises a D.-C. trigger which will generate a square wave output when the input voltage passes through its preset trigger levels. The square wave output 16, provided by Schmitt trigger 15 in response to pulse 14, is of positive polarity, has an amplitude of approximately 30 volts, and is of substantially constant width. The width of square wave 16 is nominally 100 milliseconds.

Square wave 16 is supplied on line 17 to cathode follower 18 and to one-shot multivibrator 19.

Cathode follower 18 provides the desired impedance match between the input circuits (7-9, 13 and 15) and the delay circuit which follows. The delay circuit, comprising resistor 21 and capacitor 22, reduces the rise time of the input square wave (16).

The modification of square wave 16 by the delay circuit (21-22) is indicated at 23. The modified waveform 23 is supplied via cathode follower 24 to a neon diode 25. When the signal from cathode follower 24 reaches its maximum level, neon diode 25 will ignite. The delay circuit (21-22) retards the time at which neon diode 25 ignites, following the arrival of square wave 16 at cathode follower 18, by reason of the reduction in the rise time of the waveform, as indicated at 23. By this means neon diode 25 is caused to ionize approximately 30 milliseconds after square wave 16 arrives at cathode follower 18. Ionization of neon diode 25 generates a step function signal 26 which is used to control discharge tube 27.

Current flows in the discharge tube 27, when neon diode 25 ionizes, discharging capacitor 28. Since resistor 32 and capacitor 28 (or 36) represent a time constant (T=RC), the voltage on the capacitor (28 or 36) is determined by the rate of input pulses to discharge tube 27. Timing capacitor 28 is connected between ground 29 and a source of charging potential at terminal 31 via resistor 32 and contacts 33 and 34 of relay 35. By switching capacitor 28 into the meter circuit amplifier 38, and capacitor 36 into the charging circuit (resistor 32 and terminal 31) with the input pulse to cathode follower 18, the voltage on capacitor 28 can be read on display device 47 as heart rate.

Capacitor 36 may be similarly charged from the source of charging potential appearing at terminal 31 via contacts 34 and 37 of relay 35. The charge on capacitor 28 may be transferred to meter circuit amplifier 38 via contacts 39 and 41 while the charge on capacitor 36 is transferred to meter circuit amplifier 38 via contacts 39 and 42. Meter circuit amplifier 38 serves to isolate the display device 47 from capacitor 28 or 36. To minimize loading of capacitor 28 (or 36) amplifier 38 has a very high input impedance. It should be understood, however, that if the display device 47 has an inherently high input impedance, amplifier 38 may be omitted.

Display device 47 may comprise a suitably calibrated voltmeter, a voltage-responsive moving-pen recorder, or any one of a number of similar indicating and/or display devices.

The switching circuit for capacitors 28 and 36 comprises one-shot multivibrator 19, flip-flop 43, and relay control 44. One-shot multivibrator 19, upon being triggered by square wave 16, will generate an output square wave approximately six seconds wide. Additional incoming square wave pulses (16) will not affect the one-shot multivibrator circuit (19) until it resets to its original state, at which time it will recycle in response to the next arriving position pulse (square wave 16).

The output pulses from one-shot multivibrator 19 are positive-going for approximately six seconds and initiate a change of state of flip-flop 43. Negative pulses will not effect a change of state of flip-flop 43. The output pulses from flip-flop 43 will be positive for six seconds and negative for six seconds, etc. These six-second pulses, appearing on line 46, turn the relay control 44 on or off in step with the incoming square waves to cathode follower 18. When relay control 44 is in the off condition, relay coil 45 will be de-energized, arm contact 34 will be closed to contact 33, capacitor 28 will be in the charging circuit, and capacitor 36 will be connected to the meter circuit amplifier 38. The maximum and minimum pull-in and drop-out of the relay control circuit is preferably of the order of 3 milliseconds.

The display device 47 effectively indicates the time between the last two heart rate pulses preceding the time that the relay control 44 switches. By this method of sampling every six seconds, the display will have no apparent delay or bounce.

Summarizing the operation of the apparatus, a plurality of electrodes (2-6) are connected to the patient 1 in order to pick up the EKG potential. The EKG potentials are applied to push/pull amplifiers 7 and 8; the output of which comprises an amplified EKG complex having the well-known PQRST configuration. The EKG wave complex 11 is applied to a clamp 9 which limits the maximum excursions of the R peak. Since the maximum amplitude of the R peak varies from patient to patient, amplifiers 7 and 8 will always provide sufficient gain such that signals will be emitted during the occurrence of an R peak. The clamped waveform 12 is then supplied to shaping circuit 13 where it is differentiated to provide a spike. The shaped pulse (spike) is supplied to Schmitt trigger 15, the output of which is a square wave (16) of constant width and amplitude for each input pulse 14. In the preferred embodiment the square wave output from the Schmitt trigger has a width of 100 milliseconds and an amplitude of 30 volts. This constant width and amplitude square wave is supplied to two sets of circuits. One of these circuits provides a time base ramp signal (indicated at 48) and the other circuit provides a switching control which determines which of two integrating capacitors (28 or 36) will be used to establish the desired measurement. In combination, these two circuits comprise a sampling and timing circuit which will measure the interval between successive heart pulses (EKG pulses) and will provide an analog output representative of this interval. The average interval between the sampled pulses will be displayed and this average value will be held until the subsequent sampling and averaging process has been completed.

In order to obtain reasonable accuracy in the measurement of heart rate, the interval between a number of heart beats should be measured since transistory noise pulses or artifacts may give a false indication as to the mean heart rate. On the other hand, relatively long sampling intervals, while providing higher accuracy, do not provide the rapid and continuous measurement of pulse rate desired. By the present invention described hereinabove there is provided means whereby a sampling interval sufficient for reasonable accuracy (e.g., six seconds) is employed, and integrating and displaying means is provided to give an uninterrupted indication of the average heart rate extant during the sampling circuit continuously and automatically recycles and is synchronized with the incoming signal so that integration does not commence during the generation of a signal pulse.

Obviously, minor variations of the instrument may be incorporated without deviating from the scope of the present invention. Since certain changes may be made in the above-described device without departing from the scope of the invention herein involved, it is intended that all matter contained in this specification or shown in the drawing shall be interpreted as illustrative and not in a limiting sense.

What is claimed is:

1. A cardiotachometer comprising:
   electrical means to convert heart beats into corresponding pulses of substantially fixed width;
   first and second capacitors;
   circuit means connected to said electrical means to alternately charge and discharge one or the other of said capacitors at the rate of occurrence of said pulses;
   control means to alternately connect said first and said second capacitors to said circuit means during successive sampling intervals; and
   voltage measuring means for indicating the accumulated charge on one of said capacitors while the other of said capacitors is connected to said circuit means and thereby indicate the rate of occurrence of said heart beats during said successive sampling intervals.

2. A cardiotachometer as defined in claim 1 wherein said electircal means comprises:
   amplifier and clamp means to convert said heart beats into signals of predetermined amplitude without regard to normal variations in the maximum amplitude of said heart beats; and
   trigger means responsive to said signals to determine the width of said pulses.

3. A cardiotachometer as defined in claim 1 wherein said circuit means comprises:
   a source of charging potential;
   a capacitor discharge device controlled by said pulses to be effective over the width of each of said pulses; and
   relay switching means for selectively connecting one or the other of said capacitors to said source of charging potential and to said discharge device.

4. A cardiotachometer as defined in claim 1 wherein said control means comprises:
   a one-shot multivibrator having a delay corresponding to said sampling interval; and
   switching means to connect said first capacitor to said circuit means during one state of said multivibrator and to connect said second capacitor to said circuit means during the other state of said multivibrator.

5. A cardiotachometer as defined in claim 1 wherein said voltage measuring means comprises:
   a high impedance isolation amplifier; and
   a voltmeter connected to the output of said amplifier.

6. A cardiotachometer comprising:
   pickup means to convert electrocardiographic signals from a patient to square wave pulses of substantially fixed amplitude and substantially fixed width;
   first and second capacitors;
   means for uniformly increasing the charge on a selected one of said capacitors;
   means for cyclically decreasing the charge on the selected one of said capacitors at a rate corresponding to the rate of said square wave pulses;
   control means to connect said first capacitor to said increasing means and to said decreasing means during a first sampling interval and to connect said second capacitor to said increasing means and said decreasing means during a second sampling interval; and
   means for measuring the output of said selected capacitor while the other said capacitor is connected to said increasing means and said decreasing means and said decreasing means and thereby indicate the rate of occurrence of said electrocardiographic signals during said successive sampling intervals.

7. A cardiotachometer as defined in claim 6 having:
   switching control means responsive to one only of said square wave pulses during a given sampling interval to synchronize the connection of said capacitors to said increasing means and said decreasing means with the commencement of a sampling interval.

8. A cardiotachometer comprising:
   a push-pull amplifier responsive to the electrocardiographic complex from a patient to provide an output signal having an amplitude in excess of a predetermined level during the occurrence of the R peak of the electrocardiographic complex regardless of the relative amplitude of the electrocardiographic complex;
   clamp means for limiting the amplitude of said output signal to a fixed level;
   a wave shaping circuit for converting said fixed-level signal to a corresponding trigger pulse;
   a D.-C. trigger responsive to said trigger pulse to generate a square wave of substantially fixed amplitude and of substantially fixed width;
   first and second capacitors;
   means for uniformly charging a selected one of said capacitors;
   circuit means responsive to said square wave pulse to discharge the selected one of said capacitors at a rate corresponding to the repetition frequency of said square wave pulses;
   control means to alternately connect said first and second capacitors to said circuit means and to said charging means during successive sampling intervals; and
   voltage measuring means for indicating the accumulated charge on one of said capacitors while the other of said capacitors is connected to said circuit means and thereby indicate the rate of occurrence of said electrocardiographic complex during said successive sampling intervals.

9. A cardiotachometer as defined in claim 8 wherein said circuit means comprises:
   a timing circuit responsive to said square wave pulses to provide an output pulse having a relatively slow rise time;
   delay means responsive to said output pulse to provide a delayed gate pulse; and
   discharge circuit means responsive to said gate pulse to discharge the selected one of said capacitors during a period which is delayed from the time of occurrence of the corresponding square wave pulse.

10. A cardiotachometer as defined in claim 8 wherein said control means comprises:
    a one-shot multivibrator having a delay corresponding to said sampling interval; and
    switching means to connect said first capacitor to said circuit means during one state of said multivibrator and to connect said second capacitor to said circuit means during the other state of said multivibrator.

11. A cardiotachometer as defined in claim 8 wherein said voltage measuring means comprises:
    a high-impedance voltmeter having a scale calibrated in units of beats per unit time.

12. A cardiotachometer comprising:
    a pickup means to provide an electrocardiographic signal from a patient;
    signal conditioning means connected to said pickup means to provide a cyclically recurring square wave substantially constant in amplitude and substantially constant in width in response to each of said electrocardiographic signals;
    first and second capacitors;
    means for applying a charging potential to one only of said capacitors at a time;
    means connected to said signal conditioning means to discharge said one capacitor during each of said recurring square waves;
    switching means having first and second conditions whereby said applying means and said discharge means are connected to said one capacitor during said first condition and are connected to the other of said capacitors during said second condition;
    switching control means responsive to one only of said recurring square waves during a given sampling interval to establish said first condition and to establish said second condition at the termination of said given sampling interval; and voltage measuring means for indicating the accumulated charge on said one capacitor during said second condition and on said other capacitor during said first condition thereby providing an indication of the rate of occurrence of said electrocardiographic signals during successive sampling intervals.

References Cited by the Examiner

UNITED STATES PATENTS

| | | | |
|---|---|---|---|
| 2,439,495 | 4/48 | Sturm | 128—2.05 |
| 2,801,629 | 8/57 | Edmark | 128—2.05 |
| 2,927,573 | 3/60 | Roepke | 128—2.05 |
| 3,129,704 | 4/64 | Burt et al. | 128—2.1 |
| 3,132,208 | 5/64 | Dymski et al. | 128—2.05 X |

OTHER REFERENCES

Molyneux: "Transistor Cardiotachometer," Electronic Engineering, March 1957, pp. 125–127.

Richards: "Analysis of Heart Murmurs," IRE Transactions on Med. Elect., December 1959, pp. 72–75.

RICHARD A. GAUDET, *Primary Examiner.*

LOUIS R. PRINCE, *Examiner.*